United States Patent
Foxenland

(10) Patent No.: US 7,567,657 B2
(45) Date of Patent: Jul. 28, 2009

(54) CHANGING PRESENTATION OF ITEMS OF INFORMATION BASED ON MESSAGE RECEPTION FREQUENCY

(75) Inventor: Eral Foxenland, Helsingborg (SE)

(73) Assignee: Sony Ericsson Mobile Communications AB, Lund (SE)

( * ) Notice: Subject to any disclaimer, the term of this patent is extended or adjusted under 35 U.S.C. 154(b) by 56 days.

(21) Appl. No.: 10/555,029

(22) PCT Filed: Apr. 14, 2004

(86) PCT No.: PCT/EP2004/003905

§ 371 (c)(1),
(2), (4) Date: Sep. 21, 2006

(87) PCT Pub. No.: WO2004/098162

PCT Pub. Date: Nov. 11, 2004

(65) Prior Publication Data

US 2008/0014982 A1  Jan. 17, 2008

Related U.S. Application Data

(60) Provisional application No. 60/467,978, filed on May 5, 2003.

(30) Foreign Application Priority Data

Apr. 28, 2003 (EP) .................................. 03009518

(51) Int. Cl.
*H04M 1/56* (2006.01)
*H04M 15/06* (2006.01)
*H04M 11/00* (2006.01)
*H04M 3/42* (2006.01)

(52) U.S. Cl. ............................ 379/142.01; 379/142.17; 379/93.23; 379/93.24; 455/415; 455/457

(58) Field of Classification Search ............ 379/142.01, 379/142.06, 142.1, 142.15, 142.17, 93.23; 455/414.1, 415, 457
See application file for complete search history.

(56) References Cited

U.S. PATENT DOCUMENTS

| 5,812,770 A | * | 9/1998 | Sakai ......................... 709/245 |
| 7,248,677 B2 | * | 7/2007 | Randall et al. ........... 379/93.23 |
| 2003/0063128 A1 | | 4/2003 | Korhonen | |
| 2004/0017376 A1 | * | 1/2004 | Tagliabue et al. ........... 345/581 |

FOREIGN PATENT DOCUMENTS

WO  WO02/082343  10/2002

OTHER PUBLICATIONS

The International Preliminary Report on Patentability for PCT/EP2004/003905, Feb. 8, 2004.

* cited by examiner

*Primary Examiner*—Quoc D Tran
(74) *Attorney, Agent, or Firm*—Myers Bigel Sibley & Sajovec, P.A.

(57) ABSTRACT

The present invention is directed towards a method, devices, a computer program product and a computer program element for changing the appearance of an item displayed to a user. A first set of electronic messages related to at least one first sender are received and the frequency at which said messages are received is determined. The appearance of at least one item (22, 26, 30) displayed in a view showing items related to received messages is then changed in dependence of said frequency. In this way a user can instantly and directly receive an indication of the messaging frequency.

25 Claims, 2 Drawing Sheets

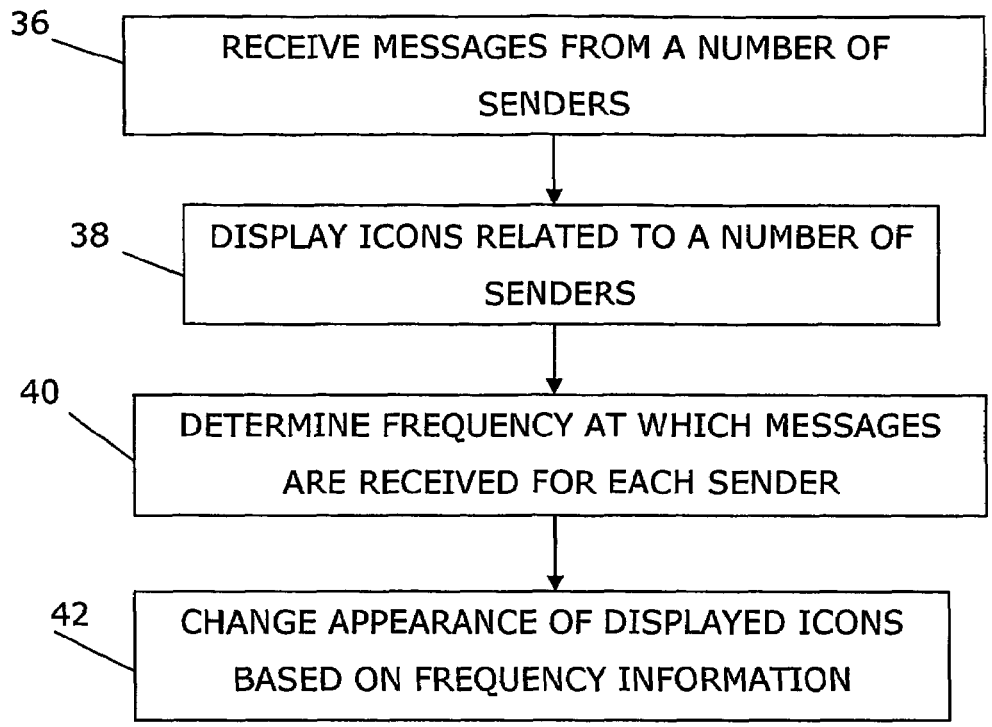
FIG. 4
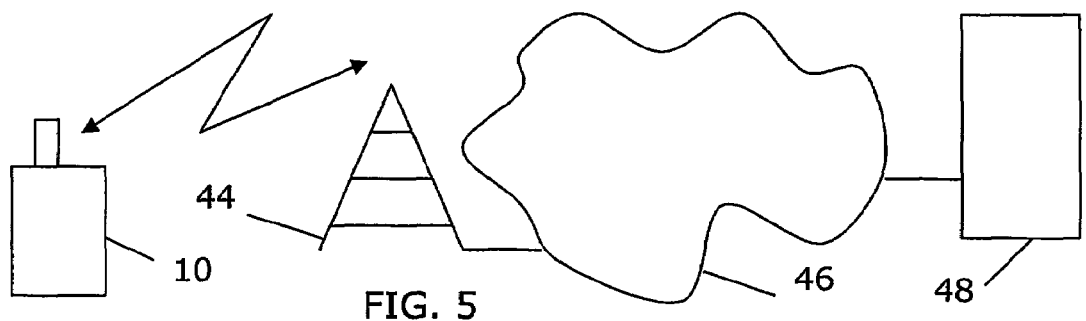
FIG. 5
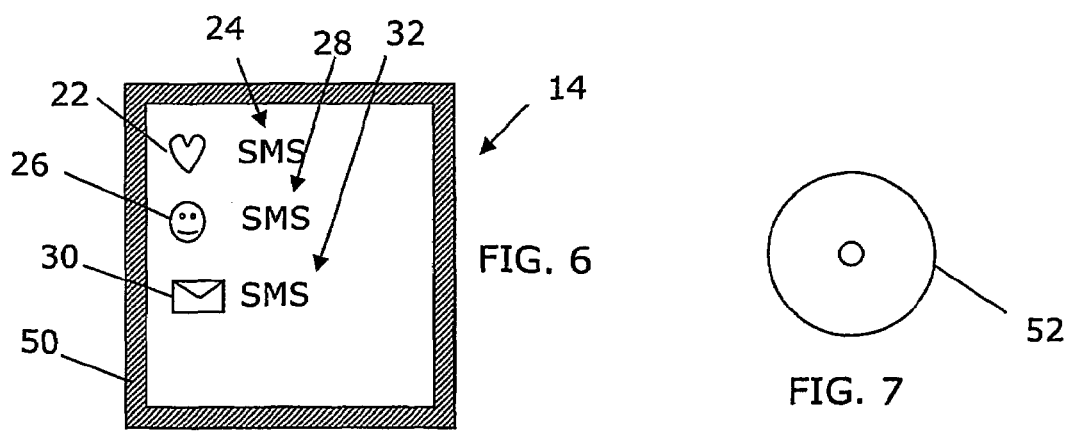
FIG. 6
FIG. 7

CHANGING PRESENTATION OF ITEMS OF INFORMATION BASED ON MESSAGE RECEPTION FREQUENCY

RELATED APPLICATIONS

The present application is a 35 U.S.C. §371 national phase application of PCT International Application No. PCT/EP2004/003905, having an international filing date of Apr. 14, 2004 and claiming priority to European Patent Application No. 03009518.6, filed Apr. 28, 2003 and U. S. Provisional Application No. 60/467,978 filed May 5, 2003, the disclosures of which are incorporated herein by reference in their entireties. The above PCT International Application was published in the English language and has International Publication No. WO 2004/098162.

TECHNICAL FIELD OF THE INVENTION

The present invention generally relates to the field of electronic messaging and more particularly to a method, a device, a computer program product as well as a computer program element for changing the presentation of an item to a user.

DESCRIPTION OF RELATED ART

The cellular phones of today have more and more different functions and applications in them. At the same time the displays are small so that the amount of information that can be presented is small, which might not be sufficient in order to show all the information that a user wants to get without having to navigate through a menu system of the phone in order to retrieve additional information.

One common type of function present in the phones of today is messaging. A user can receive several messages like e-mail messages, SMS, EMS and MMS messages. In many instances such messages are received from one and the same sender. The frequency with which a sender is sending messages to a user of a cellular phone can then be an indication of the urgency of the message. As mentioned above there is often no space available on the display for indicating such frequency of messages sent by a sender to a user. The normal way to provide such information in a phone would be to provide it in the menu system, so that a user would have to navigate in the menu system in order to find it. This can be both complicated and time consuming and might therefore be a source of irritation to a user.

There is thus a need to be able to provide additional information relating to the frequency of messages received from senders without having to add additional items shown to a user and without the user having to navigate in a menu system or in other ways have to perform different actions in order to obtain this information.

SUMMARY OF THE INVENTION

The present invention is thus directed towards solving the problem of providing additional information relating to the frequency of received messages from senders without having to add additional items presented to a user and without the user having to search for this information.

This is achieved by changing the presentation of presented items related to received messages from at least one sender, which change is made based on the frequency of these received messages.

One object of the present invention is to provide a method enabling the provision of additional information relating to the frequency of received messages from senders without having to add additional items presented to a user and without the user having to search for this information.

According to a first aspect of the present invention, the object is achieved by a method of changing the presentation of an item presented to a user comprising the steps of:
  receiving a first set of electronic messages related to at least one first sender,
  determining the frequency at which said messages are received, and
  changing the presentation of at least one item in dependence of said frequency.

A second aspect of the present invention is directed to a method including the features of the first aspect, wherein the item is a visual item displayed to a user and the step of changing the presentation comprises changing the appearance of at least one item displayed in a view showing items related to received messages.

A third aspect of the present invention is directed to a method including the features of the second aspect, wherein the item is an item identifying said at least one first sender.

A fourth aspect of the present invention is directed towards a method including the features of the third aspect, wherein the step of changing the appearance is performed on said item identifying at least one first sender.

A fifth aspect of the present invention is directed towards a method including the features of the third aspect, wherein the item identifying said at least one first sender is an icon.

A sixth aspect of the present invention is directed towards a method including the features of the fifth aspect, wherein said icon is an electronic picture.

A seventh aspect of the present invention is directed towards a method including the features of the third aspect, further comprising the step of receiving at least a second set of electronic messages, where the second set relates to at least one second sender and items are displayed relating to both the first and the second senders in a certain order, wherein the step of determining frequency is also performed on the second set of messages and the step of changing the appearance comprises changing the order in which the items are displayed based on the frequencies.

An eighth aspect of the present invention is directed towards a method including the features of the second aspect, wherein the step of changing the appearance is performed on graphics surrounding a number of items of information related to the user.

A ninth aspect of the present invention is directed towards a method including the features of the second aspect, wherein at least said first set of electronic messages are related to only one first sender.

A tenth aspect of the present invention is directed towards a method including the features of the second aspect, wherein at least said first set of electronic messages are related to a group of senders.

Another object of the present invention is to provide a device, which enables the provision of additional information relating to the frequency of received messages from senders without having to add additional items presented to a user and without the user having to search for this information.

According to an eleventh aspect of the present invention, this object is achieved by a device for changing the presentation of an item presented to a user comprising:
  an electronic message receiving unit receiving a first set of electronic messages related to at least one first sender, and
  a control unit arranged to:

determine the frequency at which said messages are received, and change the presentation of at least one item in dependence of said frequency.

A twelfth aspect of the present invention is directed towards a device including the features of the eleventh aspect, wherein the item is a visual item displayed to a user and the control unit is arranged to change the appearance of the item displayed in a view showing items related to received messages in dependence of the frequency.

A thirteenth aspect of the present invention is directed towards a device including the features of the twelfth aspect, further comprising an information presentation unit for displaying said items.

A fourteenth aspect of the present invention is directed towards a device including the features of the twelfth aspect, wherein the item is an item identifying said at least one first sender.

A fifteenth aspect of the present invention is directed towards a device including the features of the fourteenth aspect, wherein the control unit is arranged to change the appearance of said item identifying at least one first sender.

A sixteenth aspect of the present invention is directed towards a device including the features of the fourteenth aspect, wherein the item identifying said at least one first sender is an icon.

A seventeenth aspect of the present invention is directed towards a device including the features of the sixteenth aspect, wherein said icon is an electronic picture.

An eighteenth aspect of the present invention is directed towards a device including the features of the fourteenth aspect, wherein the electronic message receiving unit receives at least a second set of electronic messages, which second set relates to at least one second sender and items are displayed relating to both the first and the second senders in a certain order, wherein the control unit is further arranged to determine frequency also for the second set of messages and when changing the appearance of at least one item is further arranged to change the order in which the items are displayed based on the frequencies.

A nineteenth aspect of the present invention is directed towards a device including the features of the twelfth aspect, wherein the control unit when performing changing the appearance is arranged to change the appearance of graphics surrounding a number of items of information related to the user.

A twentieth aspect of the present invention is directed towards a device including the features of the twelfth aspect, wherein at least said first set of electronic messages are related to only one first sender.

A twenty-first aspect of the present invention is directed towards a device including the features of the twelfth aspect, wherein at least said first set of electronic messages are related to a group of senders.

A twenty-second aspect of the present invention is directed towards a device including the features of the twelfth aspect, wherein the device is a portable electronic device.

A twenty-third aspect of the present invention is directed towards a device including the features of the twenty-second aspect, wherein the device is portable communication device.

A twenty-fourth aspect of the present invention is directed towards a device including the features of the twenty-third aspect, wherein the device is a cellular phone.

A twenty-fifth aspect of the present invention is directed towards a device including the features of the twelfth aspect, wherein the device is a server.

Another object of the present invention is to provide a device, which enables the provision of additional information relating to the frequency of received messages from senders in a wireless village environment without having to add additional items presented to a user and without the user having to search for this information.

According to a twenty-sixth aspect of the present invention, this object is achieved by a device for changing the presentation of an item presented to a user comprising:

a control unit arranged to:
receive information about the frequency at which electronic messages related to at least one first sender have been received, and
provide at least one item with a changed presentation in dependence of said frequency.

A twenty-seventh aspect of the present invention is directed towards a device including the features of the twenty-sixth aspect, wherein the item is a visual item and the control unit is arranged to provide the item with a changed appearance in a view showing items related to received messages in dependence of the frequency.

Another object of the present invention is to provide a computer program product, which enables the provision of additional information relating to the frequency of received messages from senders without having to add additional items presented to a user and without the user having to search for this information.

According to a twenty-eighth aspect of the present invention, this object is achieved by a computer program product for changing the presentation of an item presented to a user comprising a computer readable medium, having thereon:

computer program code means, to make a computer or an electronic equipment execute, when said program is loaded in the computer or the electronic equipment,
determine the frequency at which a first set of electronic messages related to at least one first sender are received, and
change the presentation of at least one item in dependence of said frequency.

Another object of the present invention is to provide a computer program element, which enables the provision of additional information relating to the frequency of received messages from senders without having to add additional items presented to a user and without the user having to search for this information.

According to a twenty-ninth aspect of the present invention, this object is achieved by a computer program element for changing the presentation of an item presented to a user comprising:

computer program code means to make a computer or an electronic equipment execute when said element is loaded in a computer or an electronic equipment:
determine the frequency at which a first set of electronic messages related to at least one first sender are received, and
change the presentation of at least one item in dependence of said frequency.

The invention has the following advantages. It saves space on the display, in that no or very little extra space is used for indicating the information relating to the frequency information. Therefore the display can be used for other information as well. Because of the invention a user can furthermore provide the messaging frequency information in relation to icons in a way that best suits his tastes. It also gives a user an instant and direct indication of the messaging frequency, which can be informative, useful, interesting and funny. The invention is also very inexpensive to implement, since the messaging frequency function can be provided with just some extra software in addition to the software already existing in the device.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which:

FIG. 4 shows a flow chart of a method according to the invention, FIG. 5 shows a schematic drawing of a network including a server supporting wireless village to which the phone in FIG. 1 is connected, FIG. 6 shows a front view of the display in the phone from FIG. 1 according to an alternative embodiment of the invention, and FIG. 7 shows a CD Rom disc comprising program code for performing the invention.

DETAILED DESCRIPTION OF EMBODIMENTS

Figure 1:
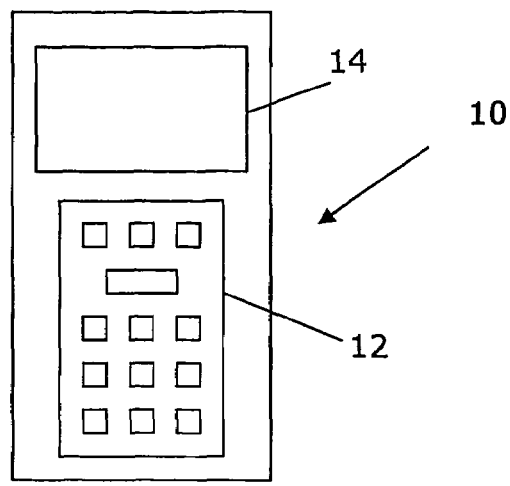
FIG. 1 shows a front view of a portable electronic device in the form of a cellular phone.

A device according to the invention, which here is a portable electronic device 10 is shown in a front view in FIG. 1. In the preferred embodiment the device is a cellular phone 10 having an information presentation unit in the form of a display 14 and a keypad 12. The device also has an antenna. It is however not shown in this view because it is in-built in the interior of the phone. Apart from making and receiving telephone calls, the keypad 12 is used for entering information such as selection of functions and applications and responding to prompts and the display 14 is used for displaying functions and prompts to a user of the phone. In order to do this, the keypad 12 can be used for navigating up and down through a menu system provided in the phone. In the menu system sets of items are often provided in the form of lists, where one such list is the inbox concerning received messages, where the latest received messages are shown. The content of a message can then be selected by clicking on the icon in question.

Figure 2:
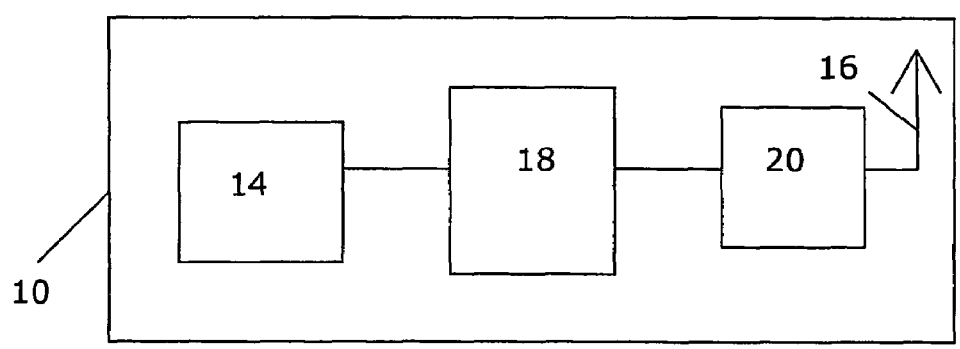
FIG. 2 shows a block schematic of the relevant parts of the invention inside the phone in FIG. 1.

FIG. 2 shows a block schematic of some parts of the phone 10 relevant to the present invention. The display 14 is here shown as a box connected to a control unit 18. The control unit 18 is furthermore connected to an electronic message receiving unit or messaging unit 20, which in turn is in contact with an antenna 16 for sending and receiving messages.

Figure 3A:
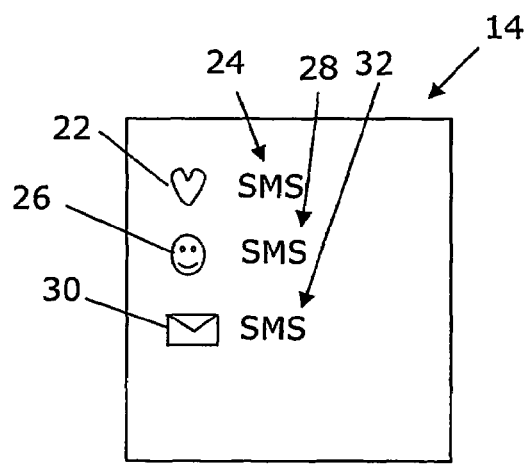
FIG. 3A shows a front view of the display in the phone from FIG. 1 showing a number of icons.
Figure 3B:
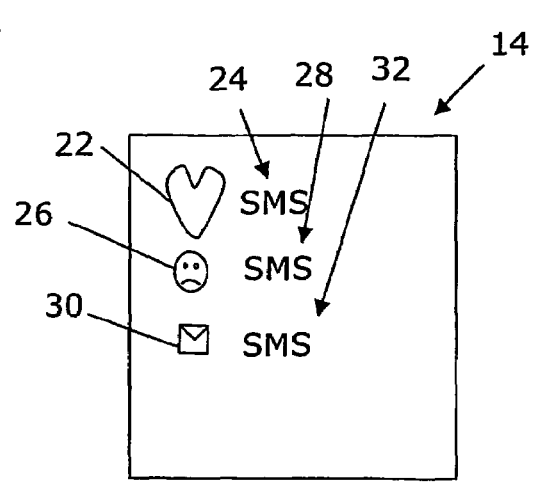
FIG. 3B shows a front view of the display from FIG. 3 showing the icons, where their appearance have been changed depending on messaging frequency.

In FIG. 3A a front view of the display 14 is shown, where the inbox menu with icons related to a number of received messages are shown. Here the user has previously set specialised icons to represent different senders that are provided in a list of contacts of the user. Thus messages received from some contacts are shown with a special icon associated with this contact. The actual message can then be obtained by clicking on the icon in question. The display shows three icons, for illustrative purposes only, together with text identifying the type of message. It should be realised that more icons could be shown. The text identifying the type of message need furthermore also not be shown. In FIG. 3A there is a first icon 22 in the form of a heart together with a first indication 24 of the type of message received from a first sender, which is an SMS message. A second icon 26 in the form of a happy face together with a second message indication 28, also indicating an SMS message associated with a second sender and a third icon 30 in the form of a default message icon associated with a third sender and a corresponding third message indication 32, where the type is again an SMS message. FIG. 3B shows the same display as in FIG. 3A, here however the shapes of these icons have been changed somewhat, in that the first icon is bigger, the second icon shows a sad face instead of a happy face and the third icon is smaller. The reason for the change will be described in more detail later on.

FIG. 4 shows a flow chart of the method according to the invention.

A preferred embodiment of the present invention will now be explained with reference to FIGS. 1, 2, 3A, 3B and 4. This embodiment is also believed to be the best mode of the invention at the moment. As described earlier the user has selected to provide specialised icons for some of the contacts, like for instance a heart for his girlfriend and a face for his boss at work. The messaging unit 20 receives messages via the antenna 16 from a number of senders, step 36, where the messages can be seen as being received in a different number of sets, where each set is associated with a sender or contact. The messaging unit is a standard messaging unit arranged to send and receive electronic messages, for instance e-mail, SMS, MMS and EMS messages. There is thus a first set of messages associated with the first sender or girlfriend, a second set of messages associated with the second sender or boss and a third set of messages associated with the third sender associated with the third icon, for which the user has not set a specialised icon. This is normally the case if the sender is not provided in the contacts section of the phone or if the user has selected not to provide a specialised icon for this sender. The control unit 18 displays these icons shown in FIG. 3 on display 14, step 38. This act of displaying is normally done by the user navigating in the menu system of the phone using the keypad 12 and selecting the inbox menu associated with the messaging function provided by the messaging unit 20 for display on the display 14. The control unit 18 then determines the frequency at which messages are received for each set of messages, i.e. for each sender, step 40. After having determined this frequency the control unit 18 then goes on and changes the appearance of the icons displayed depending on this frequency information, step 42, which is done such that the icons are changed to the icons shown in FIG. 3B. The shape of the heart 22 is here changed so that if many messages are received, the size of the heart becomes bigger, because the frequency of messages received from the girlfriend is high. A high frequency of messages from the boss is here used to change the face of the icon 26. In case there are many messages this is indicated with a sad face and in case there are few messages this would be indicated with a happy face. The third icon has had its shape diminished, which is generally used for indicating a low frequency. In this way the shape of the icons associated with the different senders have been changed based on the frequencies of the received messages from a sender.

The frequency is here determined based on messages during the last 24 hours. It should be realised that the frequency could be based on another time scale such as a week or a month. It is equally as well possible to use a shorter time span. As an alternative there might also be provided a higher threshold above which an indication of many messages is made and a lower threshold below which an indication of few messages is made, where a frequency in-between these thresholds leads to no changes of icons. It is of course possible to use only one such threshold, either a low or a high one as well.

It should be realised that the shapes shown for three different users were only exemplifying for the invention. There are other ways in which the appearance of the icons could have been changed. It is for instance possible that the heart could have been shown as beating instead, and then a higher reception frequency would be indicated with a higher pace on the beating of the heart. An icon can furthermore be made to move around on the display in dependence on the frequency. The icons can be provided as CLI (Calling Line Identification) pictures or any other graphical symbols, such as electronic photos of the contacts in question. It should also be understood that the method is preferably dynamic in that the frequency is continuously determined for each icon and changed continuously. There is then no real big step from for instance FIG. 3A to FIG. 3B, but the change would be made gradually depending on the messages as they are received.

Now another variation of the present invention will be described. FIG. 5 shows the cellular phone 10 connected to a cellular network 46 via a base station 44 for communication with a server 48 also connected to the network 46. The network is normally a GSM-type of network or a GPRS network. It is of course also possible that the network is WCDMA network. The server 48 is a server supplying chat possibilities to the phone, like for instance in the form of wireless village. The server 48 can be directly connected to the cellular network 46, or be connected to it via some other network. This network does of course not have to be a cellular network but can be some type of network, such as Internet, a corporate Intranet, a LAN or a wireless LAN. It can also be a so-called PSTN (Public Switched Telephone Network). According to one embodiment of the invention the server is a server, which administers a so-called wireless village or ICQ where different people can chat with each other. Here the server keeps a contact list or buddy list for the user. The contacts in this buddy list can then be provided in the form of icons, the shape of which can be changed according to frequencies of chat messages received. This information can then be downloaded into the phone of the user for displaying on the display. Here the control unit of the phone receives the frequency information from the server and provides the changed shapes on the icons stored in the phone. Alternatively the phone will receive the frequency information with an icon of changed shaped, which icon is then displayed on the display.

FIG. 6 shows a front view of the display where the shape has been changed in another way. A frame 50 is surrounding the icons. Here only the frequency related to the first icon is indicated. The frequency of the first sender has not been used to change the icon itself, but an item in the form of the frame surrounding the icons. This is then used for showing the colour red if the frequency of the messages from the girlfriend is high. It should be understood that it is just as well possible to change the shape of the frame instead. It is also possible to change just a part of the frame such as a bar instead. Different bars could be provided that are changed depending on the user. A frame is furthermore just an example of surrounding graphics that can be changed. It should furthermore be realised that a change of surrounding graphics can be combined with changing the appearance of an icon. Also the background could be changed instead of a frame or a bar, either in colour or pattern, or a blinking could also be provided in order to indicate a high message frequency. Another possible variation is to provide an animation that pops up on the display and that moves around on the display in dependence on the messaging frequency.

Another possible variation of the present invention is to change the order of icons shown in dependence of the messaging frequency. If for instance the frequency would be higher for the messages received from the boss than from the girlfriend, then the display in FIG. 3B would show icon 26 at the top instead of icon 22 as compared with FIG. 3A.

The control unit is normally provided in the form of one or more processors with corresponding program memories containing suitable software code. As an alternative the program code for performing the invention can be provided on a data carrier such as a CD ROM. FIG. 7 shows one such CD ROM disk 52 comprising program code for performing the invention. This program code could be provided for either the phone or the server in FIG. 6.

It is also possible that the program code could be downloaded from for instance a server provided by an operator.

The invention has many advantages. It saves space on the display, in that no or very little extra space is used for indicating the information relating to the frequency information. Therefore the display can be used for other information as well. Because of the invention a user can personalise his icons and provide the messaging frequency information in a way that best suits his tastes. It also gives a user an instant and direct indication of the messaging frequency, which can be informative, useful, interesting and funny. The invention is also very inexpensive to implement, since the messaging frequency function can be provided with just some extra software in addition to the software already existing.

The present invention can be varied in many ways. Apart from the variations already mentioned, the following further variations might also be possible. An icon can be provided for a group of users instead, such as colleagues at work. Then the messaging frequency can be decided for all these colleagues instead of just one and the icon is shaped based on the frequencies of messages received from all these persons within the group. It is possible to limit the number of senders for which frequency information is used to vary the items displayed on the display. It can be applied for only one, a few or all senders. The items described have so far only been described as visual items in the form of icons, bars and background on the display. An item does however not have to be a visual item, but can for instance also be a sound item. The volume setting of the phone can for instance be made to change in dependence of the messaging frequency such that a high messaging frequency leads to a higher volume setting and a low messaging frequency least to a lower volume setting. In relation to icons, the frequency variation can for instance also be based only on icons, which have been personalised, i.e. not on general icons. In the description examples were only given in relation to SMS messages, it should be realised that the invention can be used for all sorts of electronic messages. The invention was described in relation to a cellular phone. A cellular phone is just one example of a device in which the invention can be implemented. The invention can for instance also be used in a PDA (personal digital assistant), a palm top computer a lap top computer, a regular PC as well on a server. Therefore the present invention is only to be limited by the following claims.

The invention claimed is:

1. A method of changing a presentation of a visual item displayed to a user wherein the visual item is an icon identifying at least one first sender, the method comprising:

receiving a first set of electronic messages related to the at least one first sender wherein receiving a first set of electronic messages comprises receiving the first set of electronic messages at an inbox, and wherein the first set of electronic messages comprises e-mail, SMS, MMS, and/or EMS messages, determining a frequency at which said electronic messages are received from the at least one first sender wherein determining a frequency comprises determining the frequency at which said electronic messages are received at the inbox from the at least one first sender, changing an appearance of the icon identifying the at least one first sender displayed in a view showing icons related to received electronic messages in dependence of said frequency at which said electronic messages are received from the at least one first sender wherein changing an appearance comprises changing the appearance of the icon identifying the at least one first sender displayed in the view showing icons related to received electronic messages in dependence of said frequency at which said electronic messages are received at the inbox from the at least one first sender; and obtaining content of a received electronic message of the first set of received electronic messages responsive to a clicking on the icon.

2. A method according to claim 1, wherein said icon is an electronic picture wherein changing the appearance of the icon comprises changing a size, shape, color, blinking, and/or animation of the electronic picture in dependence of said frequency at which said electronic messages are received from the at least one first sender.

3. A method according to claim 1, further comprising: receiving at least a second set of electronic messages, where the second set of electronic messages relates to at least one second sender and icons are displayed relating to both the at least one first and the second senders in a certain order, wherein determining a frequency is also performed on the at least one second set of electronic messages and the step of changing the appearance comprises changing the order in which the icons are displayed based on the frequencies.

4. A method according to claim 1, wherein changing the appearance of the icon is performed on graphics surrounding a number of items of information related to the user.

5. A method according to claim 1, wherein the first set of electronic messages is related to only one first sender.

6. A method according to claim 1, wherein the first set of electronic messages is related to a group of senders.

7. A device for changing a presentation of a visual item displayed to a user wherein the visual item is an icon identifying at least one first sender, the device comprising:

an electronic message receiving unit configured to receive a first set of electronic messages related to the at least one first sender wherein the electronic message receiving unit is configured to receive the first set of electronic messages related to the at least one first sender at an inbox, and wherein the first set of electronic messages comprises e-mail, SMS, MMS, and/or EMS messages, and a control unit configured to determine a frequency at which said electronic messages are received from the at least one first sender, and to change an appearance of the icon identifying the at least one first sender displayed in a view showing icons related to received electronic messages in dependence of said frequency at which said electronic messages are received from the at least one first sender, wherein the control unit is configured to determine the frequency at which said electronic messages are received at the inbox from the at least one first sender, and to change the appearance of the icon identifying the at least one first sender displayed in the view showing icons related to received electronic messages in dependence of said frequency at which said electronic messages are received at the inbox from the at least one first sender, and wherein the control unit is configured to obtain content of a received electronic message of the first set of received electronic messages responsive to a clicking on the icon.

8. A device according to claim 7, further comprising: an information presentation unit configured to display said icon in the view showing icons related to received electronic messages.

9. A device according to claim 7, wherein said icon is an electronic picture wherein changing the appearance of the icon comprises changing a size, shape, color, blinking, and/or animation of the electronic picture in dependence of said frequency at which said electronic messages are received from the at least one first sender.

10. A device according to claim 7, wherein the electronic message receiving unit is configured to receive at least a second set of electronic messages, which second set of electronic messages relates to at least one second sender and icons are displayed relating to both the at least first and the second senders in a certain order, wherein the control unit is further arranged to determine a frequency also for the second set of electronic messages and when changing the appearance of at least one icon is further arranged to change the order in which the icons are displayed based on the frequencies.

11. A device according to claim 7, wherein the control unit when performing changing of the appearance of the icon is arranged to change the appearance of graphics surrounding a number of icons of information related to the user.

12. A device according to claim 7, wherein the first set of electronic messages are related to only one first sender.

13. A device according to claim 7, wherein the first set of electronic messages are related to a group of senders.

14. A device according to claim 7, wherein the device is a portable electronic device.

15. A device according to claim 14, wherein the device is portable communication device.

16. A device according to claim 15, wherein the device is a cellular phone.

17. A device according to claim 7, wherein the device is a server.

18. A computer readable medium encoded with a computer program for changing a presentation of a visual item displayed to a user wherein the visual item is an icon identifying at least one first sender, having thereon:

computer program code configured to make a computer or an electronic equipment execute, when said program is loaded in the computer or the electronic equipment, receiving a first set of electronic messages related to the at least one first sender wherein receiving a first set of electronic messages comprises receiving the first set of electronic messages at an inbox, and wherein the first set of electronic messages comprises e-mail, SMS, MMS, and/or EMS messages, determining a frequency at which said electronic messages from the at least one first sender are received, wherein determining a frequency comprises determining the frequency at which said electronic messages are received at the inbox, and changing an appearance of the icon identifying the at least one first sender displayed in a view showing icons related to received electronic messages in dependence of said frequency at which said electronic messages are received from the at least one first sender, wherein changing an appearance comprises changing the appearance of the icon identifying the at least one first sender displayed in the view showing icons related to received electronic messages in dependence of said frequency at which said electronic messages are received at the inbox from the at least one first sender; and obtaining content of a received electronic message of the first set of received electronic messages responsive to a clicking on the icon.

19. A method according to claim 1 wherein changing the appearance of the icon comprises changing a size, shape, color, blinking, and/or animation of the icon in dependence of said frequency at which said electronic messages are received from the at least one first sender.

20. A method according to claim 7 wherein changing the appearance of the icon comprises changing a size, shape, color, blinking, and/or animation of the icon in dependence of said frequency at which said electronic messages are received from the at least one first sender.

21. A computer readable medium according to claim 18 wherein changing the appearance of the icon comprises changing a size, shape, color, blinking, and/or animation of the icon in dependence of said frequency at which said electronic messages are received from the at least one first sender.

22. A computer readable medium according to claim 21 wherein said icon is an electronic picture.

23. A method according to claim 1 further comprising:
providing text together with the icon to identify a type of electronic message.

24. A device according to claim 7 wherein the controller is further configured to provide text together with the icon to identify a type of electronic message.

25. A computer readable medium according to claim 18 wherein text is provided together with the icon to identify a type of electronic message.

* * * * *